INVENTOR.
ROBERT E. DIENER
BY Hudson, Boughton
Williams, David & Hoffmann
ATTORNEYS

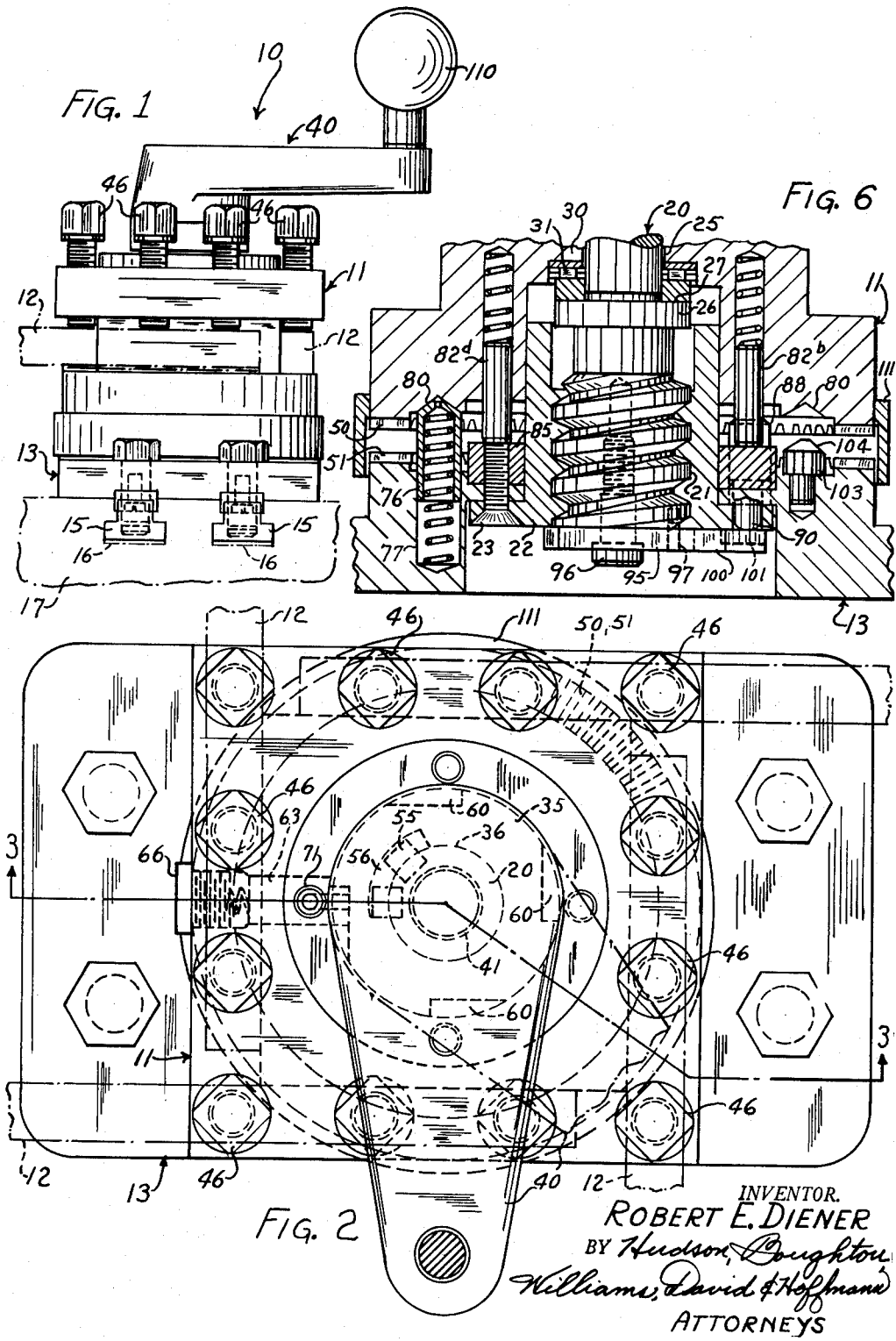

United States Patent Office 3,094,025
Patented June 18, 1963

3,094,025
MACHINE TOOL TURRET
Robert E. Diener, Shaker Heights, Ohio, assignor to The Warner & Swasey Company, Cleveland, Ohio, a corporation of Ohio
Filed Mar. 11, 1960, Ser. No. 14,380
7 Claims. (Cl. 82—36)

This invention relates to machine tool turrets for use on lathes or the like and which are of the type having a rotatable turret member which can be moved into a number of positions for selectively bringing each of a number of tools held thereby on its various faces into operative relation with respect to a workpiece.

It is an object of this invention to provide a new and improved tool holder of the above mentioned character which may be mounted on a machine tool carriage or on the cross slide of a lathe or other machine tool and in which the rotatable turret member can be rapidly unlocked and rotated or indexed to a new position in which it is automatically located and prevented from inadvertently passing that new position.

Another object of the present invention is the provision of an indexible turret which is adapted to be held in a selected angular position with respect to a supporting base by a curvic coupling means having meshing teeth, and to be clamped therein by a central shaft member which is threadedly connected to the base, and in which the shaft member is operably connected to the turret through mechanism including a lost motion connection and a ratchet means whereby initial rotation of the shaft member in one direction will separate the curvic coupling and continued rotation of the shaft member in the same direction will rotate the turret into a new position, while rotation of the shaft member in the opposite direction will lock the turret in its new indexed position.

A more specific object is the provision, in a machine tool turret having a central screw shaft, of automatic stop means including a plurality of abutment members carried by the turret for rotation therewith and held in contact with the base, and a cam means connected to the end of the screw shaft and adapted to engage and move a stop member or pin, carried in the base, into an exposed and elevated position in the path of the abutment members for engagement thereby to limit the rotation of the turret.

Other objects and advantages of the invention will be apparent from the following detailed description of a preferred exemplary embodiment thereof and from the accompanying sheets of drawings forming a part of the specification, and in which:

FIG. 1 is a side elevational view of a machine tool turret embodying the present invention;

FIG. 2 is a top plan view of the machine tool turret of FIG. 1 on an enlarged scale;

FIG. 6 is a fragmentary sectional view similar to FIG. 3 but showing parts in different relative positions.

Figures 4, 5:
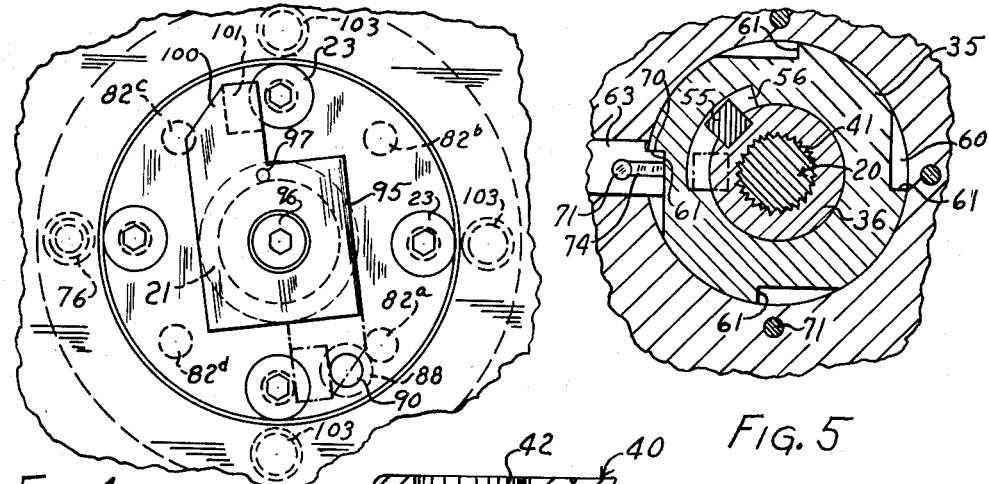
FIG. 4 is a bottom view of a portion of the turret looking from line 4—4 of FIG. 3.
FIG. 5 is a sectional view of a portion of the turret taken substantially along the line 5—5 of FIG. 3.

A four position, or square, tool turret assembly 10, embodying the present invention, is illustrated in the drawings and comprises a turret or rotatable member 11 having a plurality of faces each adapted to support a tool 12. The tools 12 are illustrated in dot and dash lines and in this instance are four in number, corresponding to the four faces of the turret 11.

Although the tool turret assembly 10, illustrated in the drawings and described hereinafter as a specific embodiment of the invention, is adapted to support four tools 12, the invention is equally susceptible of embodiment in turrets for supporting any other number of tools and having a corresponding number of faces and different index positions.

A base 13 supports the turret 11 and is provided with means such as T-shaped clamping members 15 by which the turret assembly 10 is adapted to be adjustably secured on a lathe cross-slide, or the like. The turret assembly 10 is illustrated in FIG. 1 with the clamping members 15 engaged in T-shaped slots 16 formed in a cross-slide, a portion of which is indicated at 17, so as to secure the turret to the cross-slide in a manner well known to those skilled in the art to which the invention pertains.

The turret 11 is supported for rotation and for axial movement with respect to the base 13 by means of a central shaft 20. To this end the shaft 20 has a screw portion 21, the threads of which are engaged in a nut member 22 which is secured to the base 13 as by screws 23. The shaft 20 extends through a central opening 25 in the turret 11 and is provided with a radially extending flange 26 presenting a shoulder surface 27.

The central opening 25 of the turret 11 is counterbored at both ends thereof, thereby providing an inwardly directed flange or shoulder portion 30. Thrust bearing means, such as needle bearing elements 31 and their associated races, are disposed between the shoulder portion 30 of the turret 11 and the shoulder surface 27 of the shaft 20. The turret 11 is thereby mounted on the shaft 20 in a manner for accommodating rotational relative motion therebetween, and is retained against axial motion along the shaft away from the shoulder 27 by thrust bearing means 32 located adjacent the shoulder portion 30 on the side thereof opposite the bearing elements 31.

The thrust bearing means 32 are retained in position by an annular spacer element 34, a ratchet wheel 35 and a collar 36, which form parts of a ratchet and lost motion connecting means later described in detail, a spacer or bushing member 37, and an operating handle 40. The latter, handle 40, is connected to the shaft 20 to effect rotation of the shaft, as by splines 41, and the handle is retained securely on the shaft by a nut 42 threaded thereon and locked by a set screw 43.

It will be recognized that rotation of the handle or lever 40, and the shaft 20 therewith, in a counterclockwise direction as viewed in FIG. 2 will result in a combined axial and rotational movement of the shaft 20 as the threaded portion 21 thereof rises in the nut member 22. It will also be recognized that the axial movement of the shaft 20, acting through the thrust bearing means 31 against the shoulder portion 30, will cause the turret 11 to rise or move axially away from the base 13 as is illustrated in FIG. 6. Clockwise rotation of the shaft 20 will thread the portion 21 into the nut to move the turret 11 toward the base 13.

The four tools 12 are mounted on or supported by the turret 11 on the four faces thereof, and the tools are conveniently retained in grooves 45 by set screws 46. The turret 11 is rotatable with respect to the base into four angular or index positions to selectively bring each of the four tools into operative relationship with a workpiece.

Figure 3:
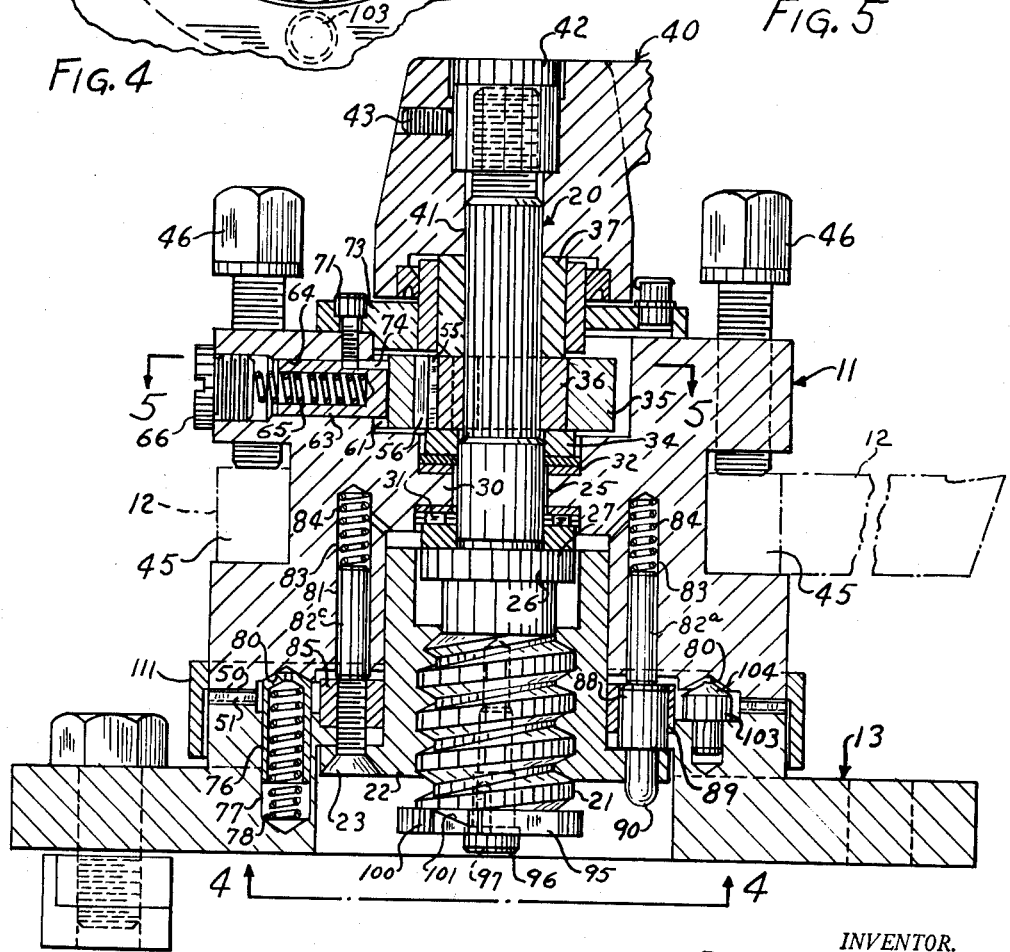
FIG. 3 is a sectional view of the turret taken substantially along line 3—3 of FIG. 2.

Curvic coupling means are provided between the turret 11 and the base 13 to lock the turret in each of the four mentioned positions, and comprises a series of teeth 50 disposed in a circular pattern and extending from the turret, and a series of complementary teeth 51 in a circular pattern and extending from the base. The teeth 50 and 51 are adapted to come into meshing engagement as in FIG. 3 when the turret is moved toward the base, and to be separated or disengaged as illustrated in FIG. 6 when moved away from the base.

When in engagement, the teeth 50, 51 prevent rotation of the turret 11, and it will be apparent that the turret can be clamped in such condition by rotation of the shaft 20 so that the threaded portion 21 thereof will draw the turret toward the base until the teeth are tightly meshed.

Rotation of the turret 11 from one position to another can be effected when the turret is in an unlocked condition, that is when the curvic coupling teeth 50, 51 are unmeshed, and the previously mentioned lost motion means and ratchet means are provided to drive the turret from the shaft 20 when the latter is rotated by moving the operating handle 40.

The collar 36 is connected for rotation with the shaft 20 by the splines 41 thereof and is provided with a key or pin 55 extending radially therefrom. The key or pin 55 is received in an arcuate slot 56 in the ratchet wheel 35, the latter being in surrounding relation to the collar 36. The pin 55 and slot 56 provide a lost motion drive connection between the collar 36 and wheel 35 so that the shaft 20 and collar 36 are adapted to have limited rotation within the ratchet wheel 35 and between positions of the pin or key 55 as shown in FIG. 2 and FIG. 5.

The pitch of the screw portion 21 of the shaft 20 is such that the limited rotation thereof relative to the ratchet wheel 35 allowed by the lost motion means formed by the pin 55 and the slot 56, will be sufficient to disengage the curvic coupling teeth 50, 51 freeing the turret 11 for rotation and indexing. The pitch of the screw portion 21 must also be such that vibration and shock experienced by the turret assembly 10 in use will not cause the screw means to rotate and loosen.

The ratchet wheel 35 has indentations 60, four in the illustrated embodiment, equally spaced about its periphery, which indentations are each defined in part by a respective radially extending shoulder 61. A plunger 63 is reciprocably mounted in a radially extending bore 64 in the turret 11 and is resiliently biased or urged into engagement with the periphery of the ratchet wheel 35 by a compression spring 65 retained by a plug 66. The plunger 63 cooperates with the ratchet wheel 35 in the manner of a pawl and is provided with a flat surface 70 to provide more complete engagement with the shoulders 61.

A screw 71, which is one of a number of like screws for securing a cover member 73 to the turret 11, has the end thereof received in a slot 74 formed in the plunger 63. The screw 71 thereby prevents rotation of the plunger 63 and maintains the plunger 63 in proper relation so that the surface 70 is always presented toward the shoulders 61.

The lost motion connection of the pin 55 and slot 56, together with the ratchet connection of the wheel 35 and plunger 63, forms connecting means by which the shaft 20 and its operating lever 41 are capable of limited rotation with respect to the turret 11 in one direction, and are capable of unlimited or free rotation with respect to the turret in the opposite direction. Thus, when the handle 40 has been moved counterclockwise until the pin 55 reaches its FIG. 5 dotted line position, further rotation will cause the ratchet wheel 35 to rotate, and the shoulder 61 bearing against the plunger 63 will carry the turret into rotation with the wheel 35.

A spring loaded detent 76 is provided to yieldably hold the turret 11 in each of its four operative positions and acts between the base 13 and the turret to resist rotation thereof out of those positions. The detent 76 is conveniently in the form of a plunger reciprocably disposed in a bore 77 in the base 13 and resiliently urged toward the turret 11 by a spring 78 for engagement in a series of depressions 80 formed in the turret. The depressions 80 are equally spaced and correspond to the four operative positions of the turret.

The plunger or detent 76 will offer sufficient resistance to rotation of the turret 11 out of any of its four operative positions to overcome any tendency of the ratchet wheel 35 to carry the turret in a clock-wise direction when the handle 40 is turned in that direction to clamp or lock the turret in a position in which it has been indexed by the detent means. The plunger 63 will therefore be depressed or urged outwardly as the ratchet wheel turns with respect to the turret 11 until the next indentation 60 is brought into position to receive the plunger.

Normally the turret 11 is rotated one position at a time in order to successively bring each of the four tools into operative position for performing certain operations in a given sequence. Means are therefore provided to prevent the turret 11 from being inadvertently rotated more than one position such as might occur if the handle 40 were moved with such force that the inertia of the turret would overcome the indexing detent 76 and carry it beyond the desired position.

Four stop or abutment elements 82a, 82b, 82c and 82d, corresponding to the four operative positions of this embodiment, are slidably received in axially extending bores 81 in the turret 11 and are resiliently biased toward the base 13 by compression springs 84. The stop elements 82a, 82b, 82c, and 82d continually bear against the base 13, and in the illustrated embodiment, against a ring 85 secured to the base by the screws 23, and describe arcuate paths therealong as the turret 11 is rotated with respect to the base.

A single stop element or pin 88 is reciprocably mounted in a stepped bore 89 extending through the ring 85, the base 13 and nut 22, and has a depending end portion 90 extending below the nut 22 and adjacent the screw portion 21 of the shaft 20. The pin 88 is normally flush with the surface of the ring 85 against which the stop elements 82a, 82b, 82c, and 82d bear, and is adapted to be moved toward the turret 11.

A stop actuating cam member 95 is secured directly to the end of the lower end of screw portion 21 of the shaft 20 by a screw 96 and is locked for rotation therewith as by a key or pin 97. The cam member 95 is provided with a radially extending arm 100, best seen in FIG. 4, which is provided with a sloping cam surface 101.

Upon rotation of the shaft 20 by movement of the handle 40 from its full line position of FIG. 2 to its dot-and-dash line position, the pin 55 will travel in its slot 56 without imparting movement to the ratchet wheel 35 and the screw portion 21 will cause the shaft 20 to rise in the nut 22 thereby lifting the turret to separate the teeth 50, 51 of the curvic coupling means. When the pin 55 engages the end of the slot as shown in dot-dash lines in FIG. 2, further counterclockwise movement of the handle 40 will drive the wheel 35 with the pin 55 and rotate the turret 11, through coaction of the ratchet wheel 35 and plunger 63. The screw portion 21 of the shaft 20 continues to rise as the handle is rotated and the continued rotation of the shaft 20 rotates the arm 100 of the cam member 95 into engagement with the end portion 90 of the stop pin 89.

The latter will ride up the cam surface 101, and as illustrated in dot-and-dash lines in FIG. 4 and full lines in FIG. 6, will assume an elevated position extending above the surface of the ring 85 and in the path of the stop element 82b. The elevated pin 88 is thereby positioned to prevent movement of the turret 11 beyond the point of contact of the stop element 82b with the stop pin 88. This point may be in the order of 10 degrees of rotation beyond the desired index position normally indicated to the operator by feeling the engagement of the detent 76 with the corresponding one of the depressions 80. Accordingly, the stop pin 88 is, in the described embodiment, called into play only if the operator moves the turret past the next index position of the turret 11.

When the turret 11 has been rotated to its new index position, it can be locked therein by rotating the handle 40 and the shaft 20 in a clockwise direction, thereby screwing the shaft into the nut 22 and lowering the turret until it is firmly clamped against the base with the teeth 50, 51 in mesh. The shaft 20 is permitted by the lost motion connection and ratchet means, described heretofore, to rotate in a clockwise direction for clamping of the turret while leaving the turret in its newly indexed position.

In order to insure proper alignment and meshing of the teeth 50, 51, a plurality of locating elements or studs 103 having conical tips 104 are provided on the base 13. The studs 103 are adapted to engage the turret 11 by entering in the depressions 80 thereof and, because of the conical surfaces of the studs and depressions, tend to rotate the turret as it is lowered and to preclude the possibility of the teeth 50, 51 hitting end on end or being rotatively displaced by an amount of one or more teeth. Once the studs 103 have guided the teeth 50, 51 into mesh, the teeth themselves take over the alignment and positioning of the turret 11 as it is fully lowered and clamped.

If for some purpose it is desired to advance the turret 11 two or more positions, this may be done by moving the handle 40 back and forth thereby ratcheting the turret ahead one step at a time. Moreover, when the turret is in an unlocked condition, and the handle 40 has not been moved sufficiently to actuate the positive stop pin 88, the turret can be manually rotated to any desired position.

The cam member 95 is adapted to act as a limit stop for rotation of the shaft 20 in that the length of the screw portion 21 is so chosen that the cam member engages the underside of the nut 22 as shown in FIG. 6 at substantially the same time as the stop element 82 strikes the elevated stop pin 88.

For convenience in operation the handle 40 may be provided with a rotatable ball or knob 110, and to prevent chips and other foreign matter from fouling the curvic coupling teeth 50, 51, a depending annular skirt or shield 111 is advantageously secured to the lower portion of the turret 11.

From the foregoing detailed description of a machine tool turret embodying the present invention, and from the accompanying drawings thereof, it will be apparent that there has been provided by the invention a rugged and dependable indexing turret which is flexible in its use and operation and is rotatable to a positive stop, or to positions beyond the positive stop without going through complete cycles of operating handle movements for the latter positions.

It will also be apparent that the invention may be embodied in relatively simple and inexpensive constructions and will provide accurate and reliable positioning of the tools carried thereby.

Although the invention has been described in considerable detail with reference to a specific embodiment thereof, it is understood that the invention is not limited thereby but rather the invention includes all such adaptations, modifications and uses thereof as are reasonably embraced by the scope of the claims hereof.

Having described my invention, I claim:

1. A toolholder of the character described comprising a base, a shaft having a threaded connection with said base for combined rotational and axial movement with respect thereto, a turret mounted on said shaft and rotatable relative to said base into a plurality of positions, means connecting said turret to said shaft for axial movement of said turret with said shaft, a ratchet wheel surrounding said shaft, lost motion means connecting said ratchet wheel to said shaft for permitting limited rotation of said shaft with respect to said ratchet wheel in both directions of rotation, pawl means on said turret and adapted to be engaged by said ratchet wheel for movement of said turret upon rotation of said ratchet wheel in one direction, whereby rotation of said shaft in said one direction beyond said limited rotation will effect rotation of said ratchet wheel and said turret, and rotation of said shaft in the opposite direction beyond said limited rotation will effect rotation of said ratchet wheel with respect to said turret.

2. A toolholder of the character described comprising a base, a shaft having a threaded connection with said base for combined rotational and axial movement with respect thereto, a turret mounted on said shaft and rotatable relative to said base into a plurality of index positions, means connecting said turret to said shaft for axial movement of said turret away from said base upon rotation of said shaft in one direction and toward said base upon rotation of said shaft in the other direction, a ratchet wheel surrounding said shaft, lost motion means connecting said ratchet wheel to said shaft for limited rotation of said shaft with respect to said ratchet wheel in both directions of shaft rotation, radially extending pawl means mounted on said turret and adapted to be engaged by said ratchet wheel for movement thereby upon rotation of said ratchet wheel in said one direction, and spring biased detent means acting between said turret and said base for resisting movement of said turret out of said index positions, rotation of said shaft in said one direction beyond said limited rotation being effective to rotate said ratchet wheel and turret for moving the latter to one of said positions and rotation of said shaft in said other direction being effective to move said turret toward said base for locking of said turret in said index position.

3. A machine tool turret assembly comprising a base, a turret member for rotation with respect to said base into a plurality of angular index positions, screw means connecting said turret to said base, said screw means being rotatable and adapted in one direction of rotation to move said turret axially into locking engagement with said base and in the other direction of rotation to move the turret out of locking engagement with said base, connecting means for transmitting rotation from said screw means to said turret member, said connecting means comprising ratchet means and lost motion means for permitting unlimited movement of said screw means with respect to said turret in one direction of rotation and limited movement of said screw means with respect to said turret in said other direction of rotation, spring biased detent means acting between said base and turret to resist movement of the latter out of said index positions, and positive stop means on said turret and base for limiting rotation of said turret, said stop means including an abutment element on said turret and a moveable stop member on said base, said stop means being actuated by rotation of said screw means and turret past one of said index positions.

4. A machine tool turret assembly comprising a base, a turret member connected by a screw member to said base for rotational and axial movement with respect to said base, said screw member extending through said base and having a radially extending cam member thereon, a first stop member movably mounted on said turret member and biased against said base so as to maintain engagement therewith and to describe an arcurate path upon rotation of said turret, a second movable stop member mounted on said base, said cam member adapted upon rotation of said screw member and turret member to engage and move said second stop member toward said turret and into said path of said first stop member to thereby prevent further rotational movement of said turret.

5. A toolholder of the character described comprising a base, a shaft having a threaded connection with said base for combined rotational and axial movement with respect thereto, a turret mounted on said shaft and rotatable into a plurality of positions with respect to said base, interengageable locking means carried by said turret and base, said shaft being adapted to move said turret toward and away from said base for engagement and disengagement of said turret locking means, connecting means between said shaft and said turret for permitting limited rotation of said shaft with respect to said turret, positive stop means comprising a radially extending cam member connected to said shaft for rotation therewith, a plurality of spring-pressed abutment elements movably mounted on said turret, and a stop pin movably mounted in said base, said cam member being adapted to engage and move said stop pin into position for contact by one of said abutment members upon rotation of said turret beyond one of said positions.

6. A machine tool turret assembly comprising a base, a turret member for rotation with respect to said base into a plurality of rotative positions, screw means connecting said turret to said base, said screw means being rotatable in opposite directions and adapted in one direction of rotation to move said turret member axially thereof into locking engagement with said base and in the other direction of rotation to move the turret member out of locking engagement with said base, connecting means for transmitting rotation from said screw means to said turret member, said connecting means comprising ratchet means and lost motion means for permitting unlimited movement of said screw means with respect to said turret member in one direction of rotation and limited movement of said screw means with respect to said turret member in said other direction of rotation, spring biased detent means acting between said base and turret member to resist rotative movements of the latter, a radially extending cam member on said screw means, a plurality of stop elements mounted on said turret member and rotatable therewith through arcuate paths, said stop elements being biased toward said base so as to maintain contact therewith when said turret member is moved away from said base, and a movable stop pin mounted on said base, said cam member being adapted to engage said stop pin for movement thereof into the path of movement of said stop elements so as to limit rotation of said turret member beyond said positions.

7. A toolholder of the character described comprising a base, an operating shaft having a threaded portion connected with said base for combined rotational and axial movement with respect to said base, a turret mounted on said shaft and rotatable into a plurality of index positions with respect to said base and movable toward and away from said base upon axial movement of said shaft with respect to said base, connecting means for transmitting the rotary movement of said shaft to said turret for moving said turret toward and away from said base and rotating said turret, interengaging locking means carried by said turret and said base and engageable upon movement of said turret toward said base and disengageable upon movement of said turret away from said base, spring biased detent means acting between said turret and said base for resisting movement of said turret out of one of said positions, stop members on said turret and said base independent of said detent means and said interengaging locking means and engageable by rotation of the turret in one direction and upon engagement stopping rotation of said turret in said one direction, and cam means connected with said shaft for effecting engagement of said stop members upon rotation of said shaft and turret to a predetermined position.

References Cited in the file of this patent
UNITED STATES PATENTS

| | | |
|---|---|---|
| 848,822 | Greenleaf | Apr. 2, 1907 |
| 2,474,675 | Jankowski | June 28, 1949 |
| 2,547,616 | Beekman | Apr. 3, 1951 |